United States Patent
Akimoto et al.

(10) Patent No.: US 7,111,068 B2
(45) Date of Patent: Sep. 19, 2006

(54) COMMUNICATION CONTROL APPARATUS AND A COMMUNICATION CONTROL METHOD

(75) Inventors: Masao Akimoto, Kunitachi (JP); Matsutoshi Murata, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 1099 days.

(21) Appl. No.: 09/919,953

(22) Filed: Aug. 2, 2001

(65) Prior Publication Data

US 2002/0019876 A1  Feb. 14, 2002

(30) Foreign Application Priority Data

Aug. 4, 2000  (JP) .............................. 2000-236917

(51) Int. Cl.
G06F 15/16 (2006.01)
H04N 1/00 (2006.01)

(52) U.S. Cl. .................. 709/230; 709/206; 358/400

(58) Field of Classification Search ............... 709/206, 709/230, 217, 219, 203; 358/1.13, 1.15, 358/400, 402; 713/150; 717/101
See application file for complete search history.

(56) References Cited

U.S. PATENT DOCUMENTS

| | | | | |
|---|---|---|---|---|
| 5,864,676 A | * | 1/1999 | Beer et al. | 709/229 |
| 5,881,233 A | * | 3/1999 | Toyoda et al. | 709/233 |
| 6,038,551 A | * | 3/2000 | Barlow et al. | 705/41 |
| 6,101,548 A | * | 8/2000 | Okada | 709/236 |
| 6,229,884 B1 | | 5/2001 | Toyoda et al. | |
| 6,237,040 B1 | * | 5/2001 | Tada | 709/246 |
| 6,266,160 B1 | | 7/2001 | Saito et al. | |
| 6,370,247 B1 | * | 4/2002 | Takaragi et al. | 380/28 |
| 6,405,244 B1 | * | 6/2002 | Bando et al. | 709/206 |
| 6,584,564 B1 | * | 6/2003 | Olkin et al. | 713/152 |
| 6,836,792 B1 | * | 12/2004 | Chen | 709/220 |
| 6,876,462 B1 | * | 4/2005 | Okada et al. | 358/1.15 |
| 6,900,903 B1 | | 5/2005 | Iida | |
| 2001/0042136 A1 | * | 11/2001 | Guedalia et al. | 709/246 |
| 2005/0174593 A1 | * | 8/2005 | Piersol et al. | 358/1.13 |

FOREIGN PATENT DOCUMENTS

| | | |
|---|---|---|
| JP | 11-008617 | 1/1999 |
| JP | 11-039328 | 2/1999 |
| JP | 2000-099462 | 4/2000 |
| JP | 2000-137657 | 5/2000 |

OTHER PUBLICATIONS

English Language Abstract of JP 11-008617.
English Language Abstract of JP 2000-137657.
English Language Abstract of JP 11-039328.
English Language Abstract of JP 2000-099462.

* cited by examiner

Primary Examiner—Frantz B. Jean
(74) Attorney, Agent, or Firm—Greenblum & Bernstein, P.L.C.

(57) ABSTRACT

A communication control apparatus detects a predetermined signal type in accordance with SMTP protocol from a first interface section connected to an IFAX. The communication control apparatus controls communication with the IFAX in accordance with the SMTP protocol when the predetermined signal type is detected. On the other hand, the communication control apparatus controls communication with a server via a second interface section connected to a network, to which the IFAX is connected. The network is managed by the server. The communication control apparatus receives email data from the IFAX, converts it into HTML data, and transmits the HTML data to the server. Accordingly, the communication control apparatus is capable of enabling the IFAX to operate on the network managed by a HTTP protocol.

19 Claims, 20 Drawing Sheets

Fig. 7

Header
```
HTTP/1.1 200 OK
Date : Fri, 23 Jun 2000 04:13:29 GMT
Server : hoge/1.0
Connection : close
Content-Type : text/html
```

HTML document data
```
<HTML>
<HEAD><TITLE>TX sample</TITLE>
</HEAD>
<BODY BGCOLOR="#FFFFFFF">
<FORM ENCTYPE="multipart/fome-data"ACTION="/upload.cgi"METHOD="post">
<TABLE>
<TR><TD ALIGN=right>TO : </TD>
<TD><INPUT TYPE="text"NAME="to"SIZE="60"></TD>
</TD>
<TR><TD ALIGN=right>Subject: </TD>
<TD><INPUT TYPE="text"NAME="subject"SIZE="60"></TD>
</TD>
<TR><TD ALIGN =right>File Name : </TD>
<TD><INPUT TYPE="file"NAME="file"SIZE="45"></TD>
</TR>
</TABLE>
<P><INPUT TYPE="submit"VALUE="SUBMIT">
</FORM>
</BODY>
</HTML>
```

Fig. 8

TO: 
Subject: 
File Name: 
Reference...
SUBMIT

Fig. 9

```
POST/upload.cgi HTTP/1.0
Referer : http://www.hoge.co.jp/tx.htm
Proxy-Connection : Keep-Alive
User-Agent : foo/1.00
Host : www.hoge.co.jp
Accept : image/gif, image/x-xbitmap, image/jpeg, image/pjpeg, */*
Authorization : Basic YXZjYzphdmNj
Content-type : multipart/form-data ; boundary─────────8115274311ß444
```
Header

```
────────────8115274311ß444
Content-Disposition : form-data ; name="to"
                         ──Destination
abc@def.com
────────────8115274311ß444
Content-Disposition : form-data ; name="subject"
                         ──Subject
test
────────────8115274311ß444
                                                           ┌─File name
Content-Disposition : form-data ; name="file" ; filename="D : ¥¥image.tif"
II*¥000¥b¥000¥000¥021¥000¥376*¥¥000¥004¥000
  (TIFFデータ)
00¥000¥000¥000¥000¥000¥000¥000¥000¥000¥000¥000¥000¥000¥000¥000
────────────8115274311ß444──
```
Transmission data

Fig. 10

TO : abc@def.com
Subject : test
File Name : D : ¥¥image tif      Reference...
SUBMIT

Fig. 13

```
HTTP/1.1  200  OK
Date : Mon, 26 Jun 2000 05:06:04 GMT          } Header
Server : hoge/1.0
Connection : close
Content-Type : text/html <HTML>
<HEAD><TITLE>RX sample</TITLE>
</HEAD>
<BODY BGCOLOR="#FFFFFFFF">
<FORM ACTION="/download.cgi" METHOD="post">
<TABLE BORDER=1>
<TD><TH>¥215¥355¥217¥234</TH><TH>SUBJECT</TH><TH>DATE</TH><TH>SIZE</TH>
<TH>Message-Id</TH></TR>
<TR><TD ALIGN=CENTER><INPUT TYPE="checkbox"NAME="D1"></TD>
<TD><A HREF="image000.tif">IMAGE from Internet FAX</A></TD>
<TD>Fri, 19 Dec 97 21:48:32 JST</TD>
<TD>23134</TD>
<TD>395051913DE.EE58FOOHOGE@Foo.co.jp</TD>
</TR>
<TR><TD ALIGN=CENTER><INPUT TYPE="checkbox"NAME="D2"></TD>
<TD><A HREF="image001.tif">IMAGE from Internet FAX</A></TD>
<TD>Thu, 21 Oct 1998 16:34:30 +0900</TD>
<TD>56789</TD>
<TD>395053DC32.EE59FOOHOGE@foo.co.jp</TD>
</TR>
</TABLE>
<P><INPUT TYPE="submit"VALUE="SUBMIT">
</FORM>
</BODY>
</HTML>
```

HTML document data

Fig. 14

| DELETION | SUBJECT | DATE | SIZE | Message-Id |
|---|---|---|---|---|
| ☐ | IMAGE form Internet FAX | Fri, 19 Dec 97 21:48:32 JST | 23134 | 395051913DE.EE58FOOHOGE@foo.co.jp |
| ☐ | IMAGE form Internet FAX | Thu, 21 Oct 1999 16:34:30 +0900 | 56789 | 395053DC32.EE59FOOHOGE@foo.co.jp |

SUBMIT

Fig. 15

●Example of GET command (Reception data request)
GET /image000.tif HTTP/1.0
Referer : http://www.hoge.co.jp/rx.htm
Connection : Keep-Alive
User-Agent : foo/1.00
Host : www.hoge.co.jp
Accept : image/gif, image/x-xbitmap, image/jpeg, image/pjpeg, */*
Authorization : Basic YXZjYzphdmNj
Cookie : SITESERVER=ID=09d0d169dc148c88b09862f78054e075

Fig. 16

●Example of POST command (Deletion request)
POST/download.cgi HTTP/1.0
Referer : http://www.hoge.co.jp/rx.htm
Connection : Keep-Alive
User-Agent : foo/1.00
Host : www.hoge.co.jp
Accept : image/gif, image/x-xbitmap, image/jpeg, image/pjpeg, */*
Authorization : Basic YXZjYzphdmNj
Cookie : SITESERVER=ID=09d0d169dc148c88b09862f78054e075
Content-type : application/x-www-form-urlencoded
Content-length : 5

D1=on

Header: POST/download.cgi ... Content-length : 5
Transmission data: D1=on

# COMMUNICATION CONTROL APPARATUS AND A COMMUNICATION CONTROL METHOD

BACKGROUND OF THE INVENTION

1. Field of Invention

The present invention relates to a communication control apparatus connected between an Internet facsimile apparatus and a network, that controls communication between the Internet facsimile apparatus and the network, and a communication control method.

2. Description of Related Art

Conventionally, a network using groupware software is set up in order to share information effectively within an organization such as a company. Recently, Internet technology has become common and groupware software usable from a www browser are very often used in such a network (hereafter referred to as "groupware network"). In this case, client terminals such as PCs on the groupware network can share information on the groupware network using the www browser. Therefore, the client terminals can provide features such as email and electronic bulletin boards.

On the other hand, a facsimile apparatus, which can transmit image information via the Internet by the same operation as a conventional facsimile apparatus, has been recently developed. This type of facsimile apparatus is called an Internet facsimile apparatus(hereafter referred to as IFAX) because it uses Internet for a part or all of the transmission path.

When image data is transmitted, such an IFAX device converts facsimile data into email format to transmit. On the other hand, when IFAX receives image information, it converts email data into facsimile format and executes a printing process. At this time, the email data communication of the IFAX is controlled in accordance with SMTP (Simple Mail Transfer Protocol) or POP3 (Post Office Protocol Version3).

However, communication of various kinds of data are performed using HTTP protocol in the groupware network using a www browser, as mentioned above. Therefore an IFAX that controls communication in accordance with SMTP (Simple Mail Transfer Protocol) or POP3 (Post Office Protocol Version 3) cannot be provided.

SUMMARY OF THE INVENTION

An object of the present invention is to provide a communication control apparatus that can enable an IFAX to operate on a network managed by HTTP protocol.

In the present invention, a predetermined signal type in accordance with SMTP protocol from a first interface section connected to an IFAX is detected, and a communication control apparatus controls communication with the IFAX in accordance with the SMPT protocol when the predetermined signal type is detected. On the other hand, the communication control apparatus controls communication with a server via a second interface section connected to a network, to which the IFAX is connected, managed by the server. The communication control apparatus receives email data from the IFAX and converts it into HTML data, and transmits the HRML data to the server.

Specifically, when the email data is transmitted from the IFAX to the server apparatus, the communication control apparatus communicates various kinds of signals and the email data communicates with the IFAX in accordance with the SMTP protocol. On the other hand, it communicates various kinds of signals and the email data with the server in accordance with the HTTP protocol. Thus it is possible for the IFAX to perform transmission normally even in the network managed by the HTTP protocol.

Also, in the present invention, detecting a predetermined signal type in accordance with the POP3 protocol from the first interface section connected the IFAX, when the predetermined signal type is detected, the communication control apparatus controls communication with IFAX in accordance with the POP3 protocol. On the other hand, the communication control apparatus controls communication with the server in accordance with the HTML protocol via the second interface section connected to a network, to which IFAX is connected, managed by the server. The communication control apparatus receives HTML data including email data from the server, extracts the email data from the HTML data, and transmits the extracted email data to IFAX.

Specifically, when the IFAX receives the email data from the server, the communication control apparatus communicates various kinds of signals and the email data with the IFAX in accordance with the POP3 protocol. On the other hand, it communicates various kinds of signals and the email data with the server in accordance with HTTP protocol. Thus it is possible for the IFAX to perform reception normally even in the network managed by the HTTP protocol.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 7 is the source data of a transmission form that a groupware server transmits to ADPT of the first embodiment of the present invention;

FIG. 8 is a conceptual drawing of a transmission form that a groupware server transmits to ADPT of the first embodiment of the present invention;

FIG. 9 is the source data of "POST" signal transmitted from ADPT of the first embodiment of the present invention;

FIG. 10 is a conceptual drawing of a transmission form to which transmission data transmitted from ADTP of the first embodiment of the present invention are included;

FIG. 13 is the source data of a reception form that a groupware server transmits to ADPT of the first embodiment of the present invention;

FIG. 14 is a conceptual drawing of a reception form transmitted from a groupware server to ADPT of the first embodiment of the present invention;

FIG. 15 is the source data of "GET" signal including a reception form transmitted from ADPT of the first embodiment of the present invention;

FIG. 16 is the source data of "POST" signal including a reception form outputted from ADPT of the first embodiment of the present invention;

DETAILED DESCRIPTION OF PREFERRED EMBODIMENTS

First Embodiment

Figure 1:
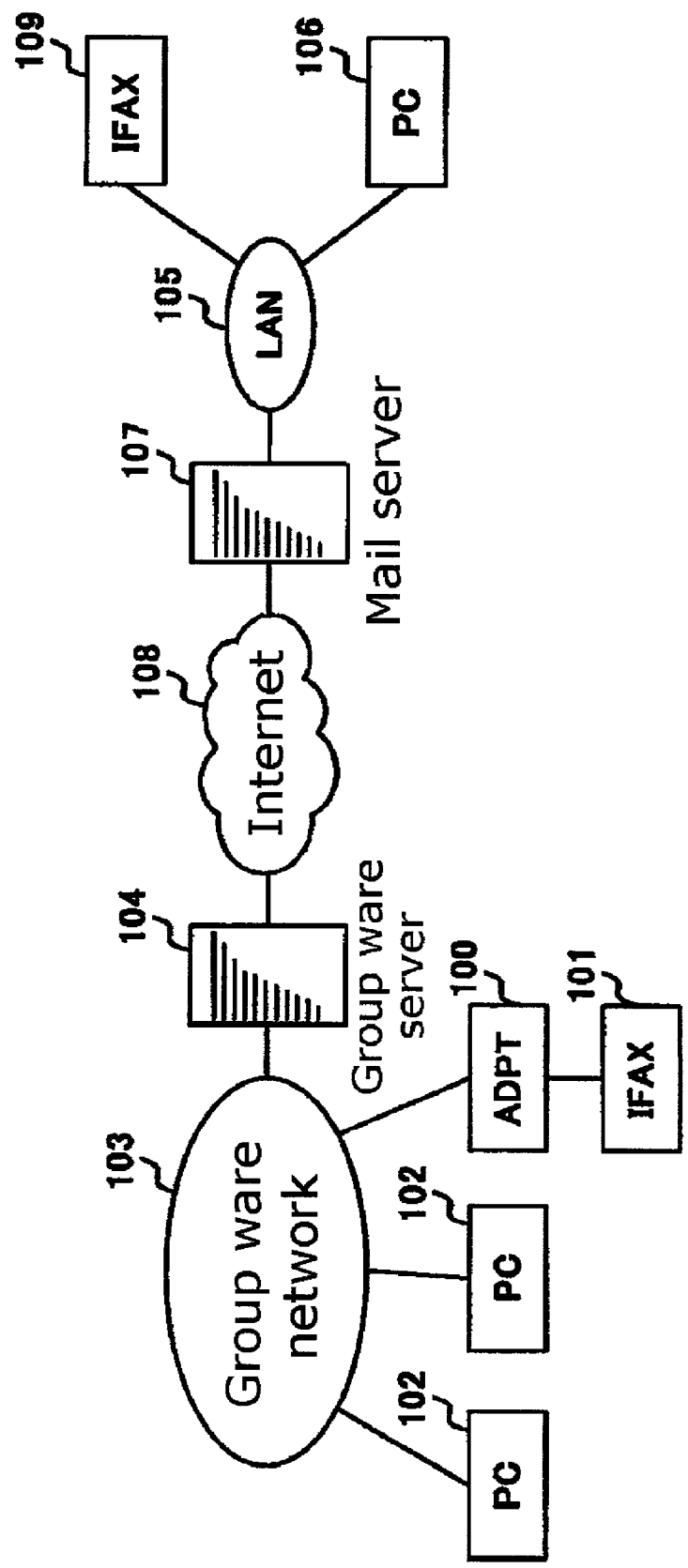
FIG. 1 is a conceptual drawing of a network on which a communication control apparatus (ADPT) of the first embodiment of the present invention operates.

FIG. 1 is a schematic drawing of the network on which a communication control apparatus of the first embodiment of the present invention operates. The communication control apparatus 100 of the present embodiment is connected to IFAX 101. The communication control apparatus functions as an adapter to convert the communication protocol when it transmits or communicates emails via the network to which IFAX 101 is connected. Accordingly, it is called an adaptor (ADPT) hereinafter.

The ADPT 100 that is connected to the IFAX 101 is also connected to a network 103 such as LAN (Local Area Network) together with a communication terminal such as PC. The network 103 is managed by a server 104 using groupware software(hereafter referred to as groupware server). Hereinafter, the network 103 managed by the groupware server 104 is called a groupware network.

The groupware server 104, for example, sets up in-house network adopting groupware software such as NOTES by LOTUS (USA). Thus, client terminals such as PC 102 can share information in the groupware network 103. Also, the groupware server 104 functions as a WEB server. Further, client terminals such as PC 102 connected to the groupware network 103 or external client terminals can share information in groupware network 103 by the use of WWW browser. The present invention described in this embodiment provides significant benefits when the groupware server 104 functions as a WEB server. Therefore, this case is described.

When PC 106 connected to LAN 105 that is outside (i.e.,external) of the groupware network 103 sends email data to a client terminal such as PC 102 in the groupware network 103, the email data is transmitted to a mail server 107 via LAN 105. Then after the determination of addressee by the mail server 107, the email data is transferred to the groupware server 104 via the Internet 108.

Receiving an email data from external source, the groupware server 104 determines a user name from the address information. The groupware server 104 checks if a client corresponding to the user name is in the groupware network or not. If it is, the groupware server 104 stores the email data in the mailbox associated the user name. And when the client terminal corresponding to the user name accesses the network, the groupware server 104 converts the email data so that the received email data can be displayed on WWW browser. Thus a client terminal such as PC 102 can read the email data on WWW browser.

Figure 2:
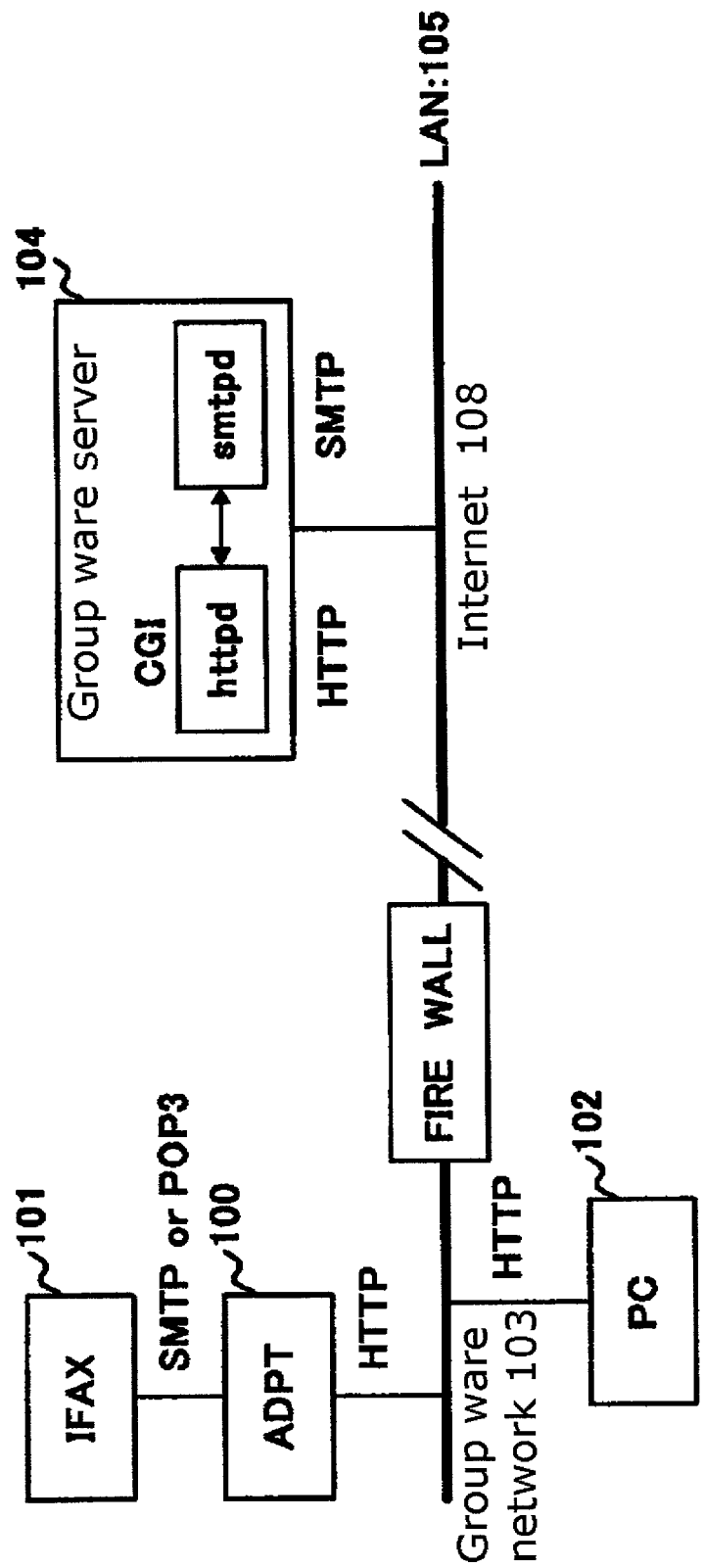
FIG. 2 is a conceptual drawing for describing communication protocols around a client terminal on a groupware network on which ADPT of the first embodiment of the present invention operates.

FIG. 2 is a schematic drawing that describes a communication protocol between the groupware server 104 and client terminals such as PC 102 on the groupware network 103 in the case mentioned above.

When PC 106 connected to LAN 105(FIG. 1) transmits email data to PC 102 on the groupware network 103, the email data is sent to the groupware server 104 via Internet 108 in accordance with the SMTP protocol. This email data is temporarily stored at the groupware server 104. When PC 102 requests the email data, the groupware server 104 converts the protocol of the email data from SMTP protocol into HTTP protocol so that it can be displayed at PC 102 equipped with WWW browser.

In FIG. 2, a Firewall (FIRE WALL) is installed between Internet 108 and the groupware network 103, protects data flow from Internet 108 and receives only data corresponding to requests from the client terminals on the groupware network 103.

On the other hand, when IFAX 109 connected to LAN 105 transmits the email data to IFAX 101 on the groupware network 103, the email is transferred from IFAX 109 to the groupware server 104 via the mail server 107 and Internet 108 the same as in the case of the email from PC 106. Then after checking the user name and determining if there is a client corresponding to the user name, the groupware server 104 stores the email data in the mailbox associated with the user name. When IFAX 101 that corresponds to the user name accesses the network via ADPT 100, the received email data is converted, the same as in the case of the email from PC 106 as discussed above.

As shown in FIG. 2, when IFAX 109 connected to LAN 105 transmits an email to IFAX 101 on the groupware 103, the email is transferred to the groupware server 104 using the SMTP protocol, the same as the email from PC 106 mentioned above. The email is stored temporarily at the groupware server 104. When IFAX 101 requests the email data via ADPT 100, the groupware server 104 converts the email from SMTP protocol to HTTP protocol.

ADPT 100 receives the email data that is processed in accordance with HTTP protocol and executes a protocol conversion process with IFAX 101. In other words, ADPT 100 transfers email data to IFAX 101 in accordance with POP3 (SMTP for transmission). POP3 is the protocol by which IFAX 101 operates. As the result, IFAX 101 can receive an email in the same way as usual email communication process and can print the received email.

Figure 3:
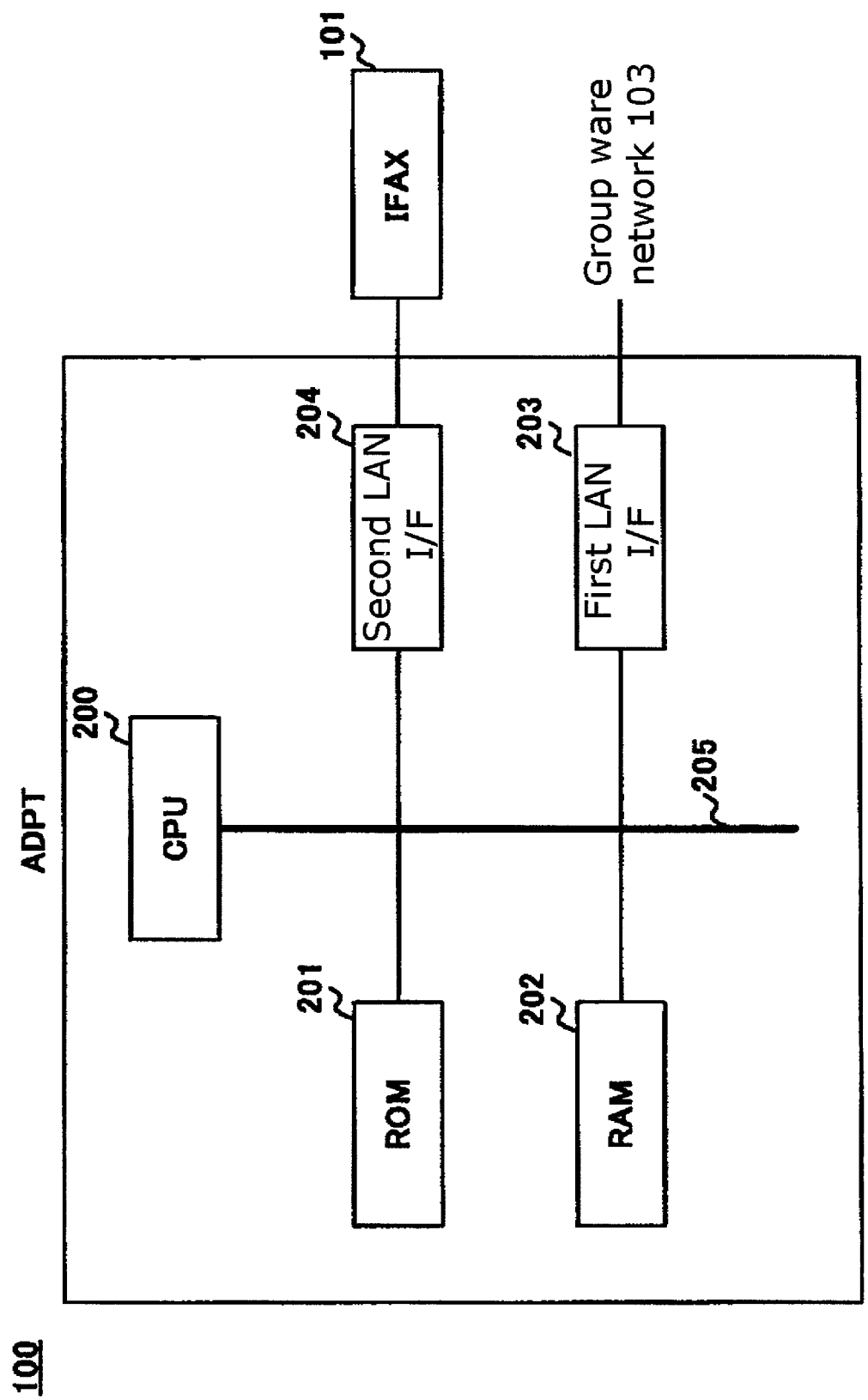
FIG. 3 is a block diagram that shows the hardware configuration of ADPT of the first embodiment of the present invention.

FIG. 3 is a schematic block diagram that shows the hardware configuration of the ADPT 100 that provides functions mentioned above.

A Central Processing Apparatus (CPU) 200 executes various programs and controls each of the sections of ADPT 100. ROM 201 stores the programs that the CPU 200 executes. RAM 202 is used as data area for programs and at the same time, is used as a memory for storing necessary data.

A first LAN interface (hereafter referred to as "the first LAN I/F") 203 is an interface to control communication of data with the groupware network 103. A second LAN interface (hereafter referred to as "second LAN I/F") 204 is an interface to control data communication with IFAX 101. The second LAN I/F 204 can be connected to all types of existing IFAX 101 devices without regard to the specifications of the IFAX in order to be connected to the interfaces provided in all existing IFAX devices. The ADPT 100 of the present invention operates between IFAX 100 and the groupware network 103 by these two LAN I/F.

Bus 205 is a path for transferring data between CPU 200, ROM 201, RAM 202 the first LAN I/F 203 and the second LAN I/F 204.

Figure 4:
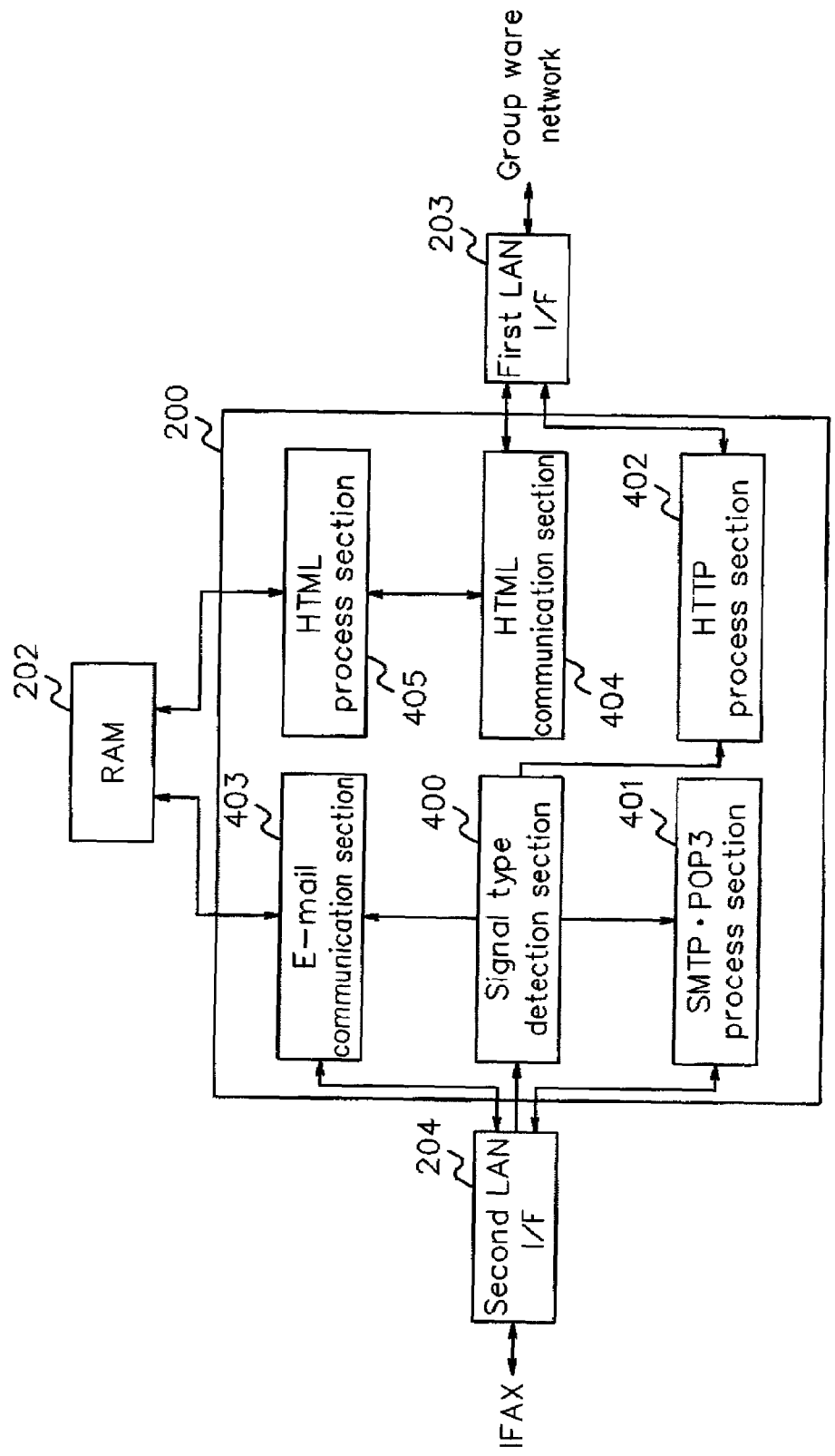
FIG. 4 is a block diagram that shows the primary functions of ADPT of the first embodiment of the present invention.

FIG. 4 is a block diagram that shows the primary functions of ADPT 100 of the embodiment mentioned above.

The signal type detection section 400 detects types of command signals output from IFAX 101 via the second LAN I/F 204. Then the signal type detection section 400 notifies the SMTP_EPOP3 processing section 401, the HTTP processing section 402, and the email communication section 403 of the reception of the command signal according to the type of the command signal.

Upon receiving notification from the signal type detection section 400, the SMTP_EPOP3 processing section 401 communicates various types signals with IFAX 101 via the second LAN I/F 204 in accordance with SMTP protocol or POP 3 protocol.

Upon receiving notification from the signal type detection section 400, the HTTP processing section 402 communicates various types signals with the groupware network 103 via the first LAN I/F 203 in accordance with HTTP protocol.

Upon receiving notification from the signal type detection section 400, the email communication section 403 communicates email data with IFAX 101 via the second LAN I/F 204. When an email is received from IFAX 101, the email communication section 403 stores the received email data in RAM 202. On the other hand, when transmitting an email to IFAX 101, the email communication section 403 retrieves the email data stored in RAM 202 and transmits it.

The HTML communication section 404 communicates HTML document data with the groupware network 103 via the first LAN I/F 203.

The HTML processing section 405 writes given data into the HTML document data received by the HTML communication section 404, and converts the email data stored in RAM 202 into HTML document.

Figure 5:
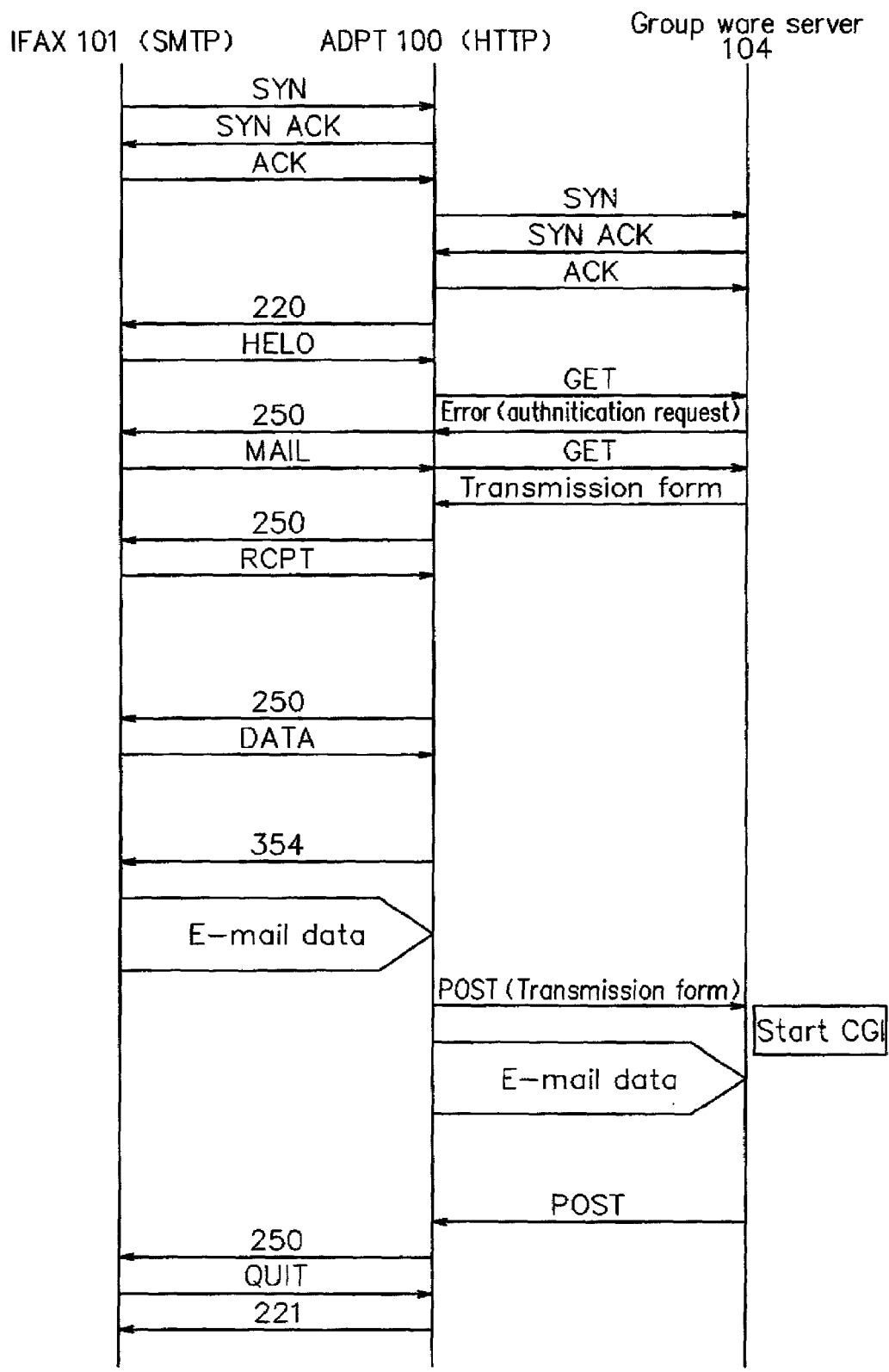
FIG. 5 is a sequence chart for the case that IFAX, to which ADPT of the first embodiment is connected, transmits an email to a groupware server.
Figure 6:
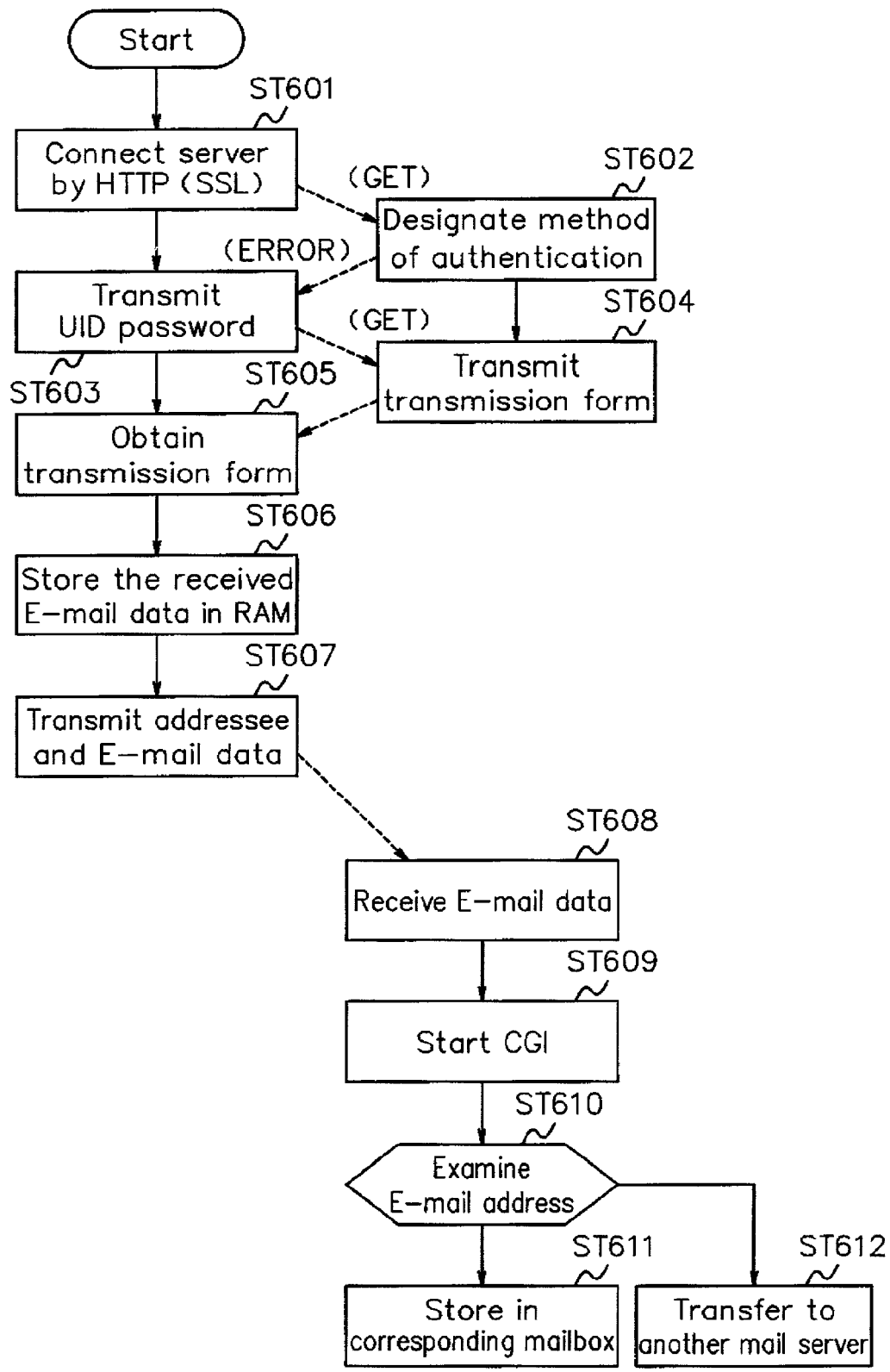
FIG. 6 is a flow chart for the case that ADPT of the first embodiment transmits email data to a groupware server.

Next, the process by which IFAX 101, to which the ADPT 100 of the configuration mentioned above is connected, transmits an email to the groupware server 104 is described using a flow chart shown in FIG. 6, referring to a sequence chart shown in FIG. 5. FIG. 5 is a sequence chart for the case that IFAX 101, to which ADPT 100 of the present embodiment is connected, transmits an email to the groupware server 104. FIG. 6 is a flow chart for the case that ADPT 100 of the present embodiment transmits email data to the groupware server 104.

When an email is transmitted to the groupware server 104, IFAX 101 first executes the procedure to establish the connection with ADPT 100. In other words, IFAX 101 transmits a command signal for synchronization (SYN) to ADPT 100 as shown in FIG. 5. Then, receiving a command signal showing confirmation of synchronization (SYN ACK) transmitted from ADPT 100 responding to SYN signal, IFAX 101 transmits a command signal (ACK) to show the reception of SYN ACK signal. By this procedure, the connection between IFAX 101 and ADPT 100 is established.

When the connection between IFAX 101 and ADPT 100 is established, ADPT 100 executes the procedure for establishing the connection with the groupware server 104. The ADPT 100 executes the same procedure that the IFAX executed as mentioned above. By this procedure the connection between ADPT 100 and the groupware server 104 is established.

When the connection between ADPT 100 and the groupware server 104 is established, the last confirmation command ACK is transmitted to the groupware server 104. After transmitting the last confirmation command ACK to the groupware server 104, the SMTP_EPOP3 processing section 401 of ADPT 100 starts communication of commands with IFAX 101 in accordance with SMTP protocol. More specifically, the SMTP_EPOP3 processing section 401 outputs response signal (220) that indicates reception-ready to IFAX 101.

Receiving "220", IFAX 101 outputs a command signal (HELO) showing the start of using communication path to ADPT 100. Receiving HELO, the signal type detection section 400 of ADPT 100 notifies the SMTP_EPOP 3 processing section 401. Receiving the notification, SMTP_EPOP3 processing section 401 outputs a response signal (250) showing reception-ready to IFAX 101.

After that, receiving a command signal showing a sender's name (MAIL), a command signal showing addressee of the message (RCPT), and a command signal showing the start of massage transmission (DATA), the SMPT_EPOP3 processing section 401 outputs "250", "250", and "354" corresponding to each of commands respectively to IFAX 101. Here, "354" is outputted after receiving transmission form, explained later, from the groupware server 104 to IFAX 101.

After receiving "354", the SMPT_EPOP3 processing section 401 receives a command signal (QUIT) that indicates end of email data and end of communication path usage outputted from IFAX 101. Then the SMPT_EPOP3 processing section 401 outputs a response signal "250" for the end of email data reception and a response signal "221" for "QUIT" to IFAX 101. According to these response signals, the connection between IFAX 101 and ADPT 100 is disconnected. Thus various signals and email data are communicated between IFAX 101 and ADPT 100 in accordance with SMTP protocol in the same way as regular email data communication.

Here the signal "250" that is outputted at the end of email data reception, is outputted to IFAX 101 after receiving "POST" signal from the groupware server 104, which will be described later.

On the other hand, when "HELO" is received from IFAX 101, the signal type detection section 400 of ADPT 100 notifies the HTTP process section 402 of such receipt. Receiving the notification, the HTTP process section 402 starts communication of command signals with the groupware server 104 in accordance with HTTP protocol. More specifically, first, the HTTP process section 402 outputs a command signal (GET) that requests connection to the groupware server 104. As a result, ADTP 100 is connected the groupware server 104 in accordance with HTTP protocol (ST601).

Furthermore, not only HTTP protocol can be used for the connection, but it is also possible to use a technology such as SSL (Secure Socket Layer) to protect the security of the data communicated with the groupware server 104.

Receiving "GET" signal, the groupware server 104 outputs an error signal including an authentication request as a response signal to ADPT 100. The error signal consists of header and HTML document data. A method of authentication is described in the HTML document data. Thus the method of authentication is designated by the groupware server 104 (ST602).

Receiving the error signal, the HTTP process section 402 transmits a command signal (GET) that indicates the request of transmission form having attached predefined user ID (UID) and password (ST603).

Receiving "GET" signal, the groupware server 104 checks if UID and the password attached to "GET" is correct or not. When it is correct, the groupware server 104 transmits data including transmission form (hereafter referred to as "transmission form data") to ADPT 100 (ST604).

Figure 8:
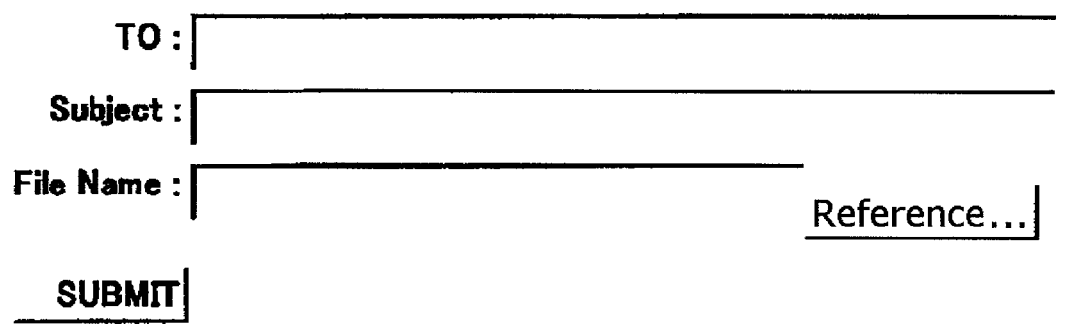

FIG. 7 shows source data of transmission form data transmitted from the groupware server 104. As shown in FIG. 7, transmission form data consists of header and HTML document data. The transmission form is included in the HTML document data. By receiving the transmission form, ADPT 100 can recognize the transmission form shown in FIG. 8. FIG. 8 is a conceptual drawing of the transmission form transmitted from the groupware server 104.

Receiving the transmission form data, the HTML communication section 404 of ADPT 100 extracts the transmission form described in HTML document data from "DATA" (ST605). At this time, the HTTP process section 402 notifies the signal type detection section 400 of the reception of the transmission form data.

Receiving the notification of receipt of the transmission form data, the signal type detection section 400 notifies SMTP_EPOP3 process section 401. Receiving the notification, the SMTP_EPOP3 process section 401 of ADPT 100 transmits a response signal "345" to IFAX 101, and prompts the transmission of email data from IFAX 101. Accordingly the email data communication section 403 receives email data transmitted from IFAX 101 and stores it in RAM 202 (ST606).

The HTML processing section 405 extracts addressee ("To" in FIG. 8), subject name ("Subject" in FIG. 8), and file name ("File Name" in FIG. 8) from the email data stored in RAM 202, and writes them to the predetermined area of the received transmission form. Then the HTML process section 405 transfers the transmission form to the HTML communication section 404. The HTML communication section 404 transmits a command signal (POST) that includes the transmission form to the groupware server 104, and at the same time, transmits email data to the groupware server 104 (ST607).

FIG. 9 shows source data of "POST" transmitted from ADPT 100. As shown in FIG. 9, "POST" consists of header and transmission data. Further the transmission data includes predetermined information that is written in the transmission form mentioned above. More specifically, address or destination (abc@def.com), subject (test), and file name (\\image.tif) are included. Receiving "POST", the groupware server 104 can recognize the transmission form in which predetermined information shown in FIG. 10 is included. FIG. 10 is a conceptual drawing of a transmission form in which transmission data transmitted from ADPT 100 are included.

Receiving "POST" and email data (ST608), the groupware server 104 starts CGI process (ST609) according to the information described in the transmission form and examines the email address of the addressee described in the transmission form (ST610). More specifically, it checks if the email address of the addressee is a client terminal on the groupware network 103. When the addressee is a client terminal on the groupware network 103, the email data is stored in a corresponding mailbox (ST611). On the other hand, if the addressee is not a client terminal on the groupware network 103, the email data is transferred to another mail server via Internet 108 (ST612).

After this, the groupware server 104 outputs a response signal of "POST" to ADPT 100 in order to designate the end of reception process of email data. As the result, the connection between the groupware server 104 and ADPT 100 is disconnected. Thus, according to the reception of "HELO" from IFAX 101, various signals and email data are communicated between the groupware server 104 and ADPT 100 in accordance with HTTP protocol.

Thus ADPT 100 of the present embodiment communicates various signals and email data with IFAX 101 in accordance with SMTP protocol when IFAX 101 transmits emails to the groupware server 104. On the other hand, ADPT 100 communicates various signals and email data with the groupware server 104 in accordance with HTTP protocol. As the result, IFAX 101 can transmit emails normally even on the groupware network 103 that communicates in accordance with HTTP protocol.

ADPT 100 of the present embodiment transmits "354" signal to IFAX 101 after receiving the transmission form data from the groupware server 104. Then after receiving email data from IFAX 101, ADPT 100 writes information, such as addressee, into the transmission form, and transmits the transmission form to the groupware server 104. Thus it is possible to prevent error caused at ADPT 100 when email data is transmitted from IFAX 101 before the recognition of transmission form and long time passes after receiving email data. Thus the present embodiment can achieve reliable communication of emails.

Figure 11:
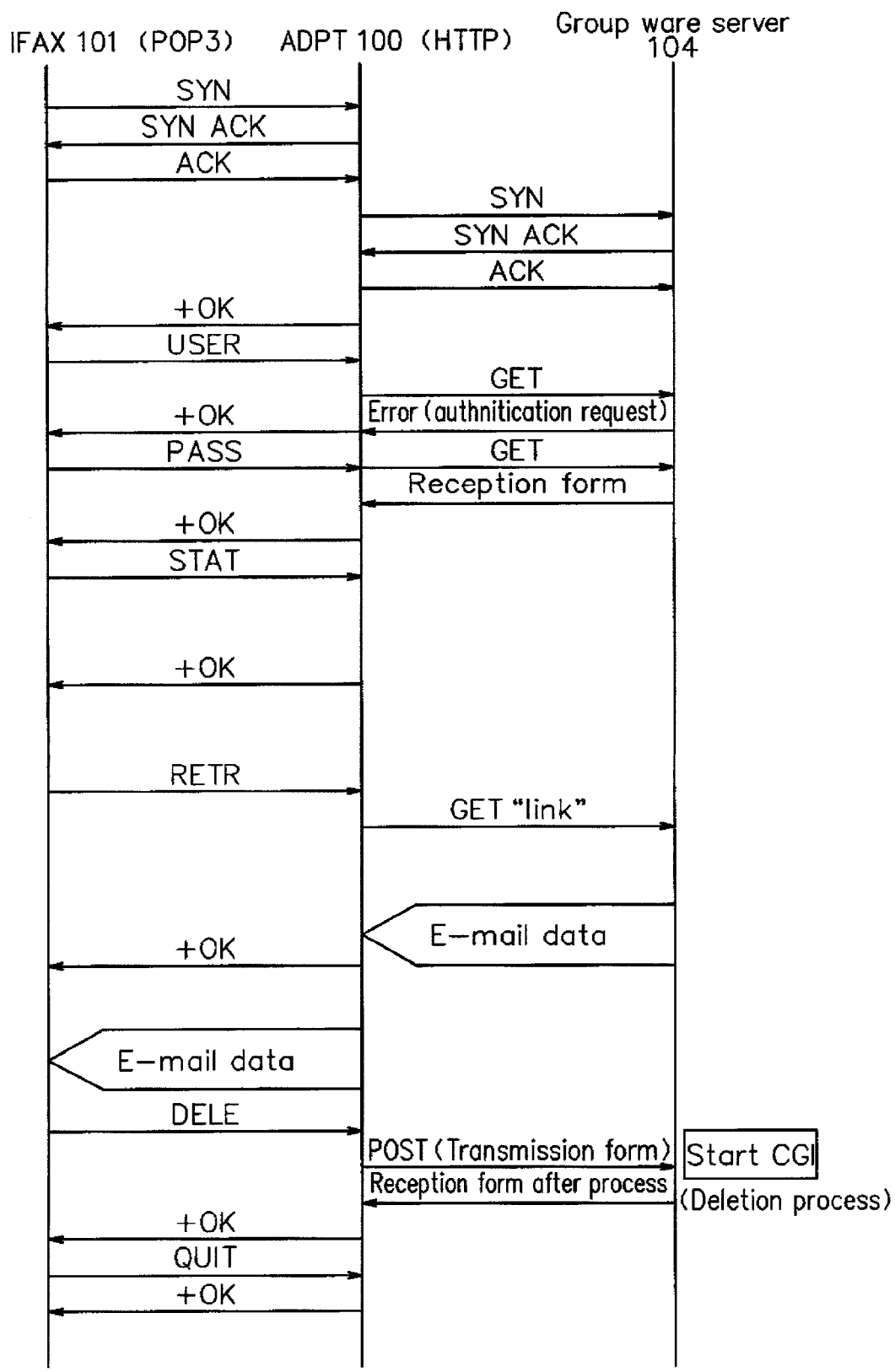
FIG. 11 is a sequence chart for the case that IFAX, to which ADPT of the first embodiment is connected, receives an email from a groupware server.
Figure 12:
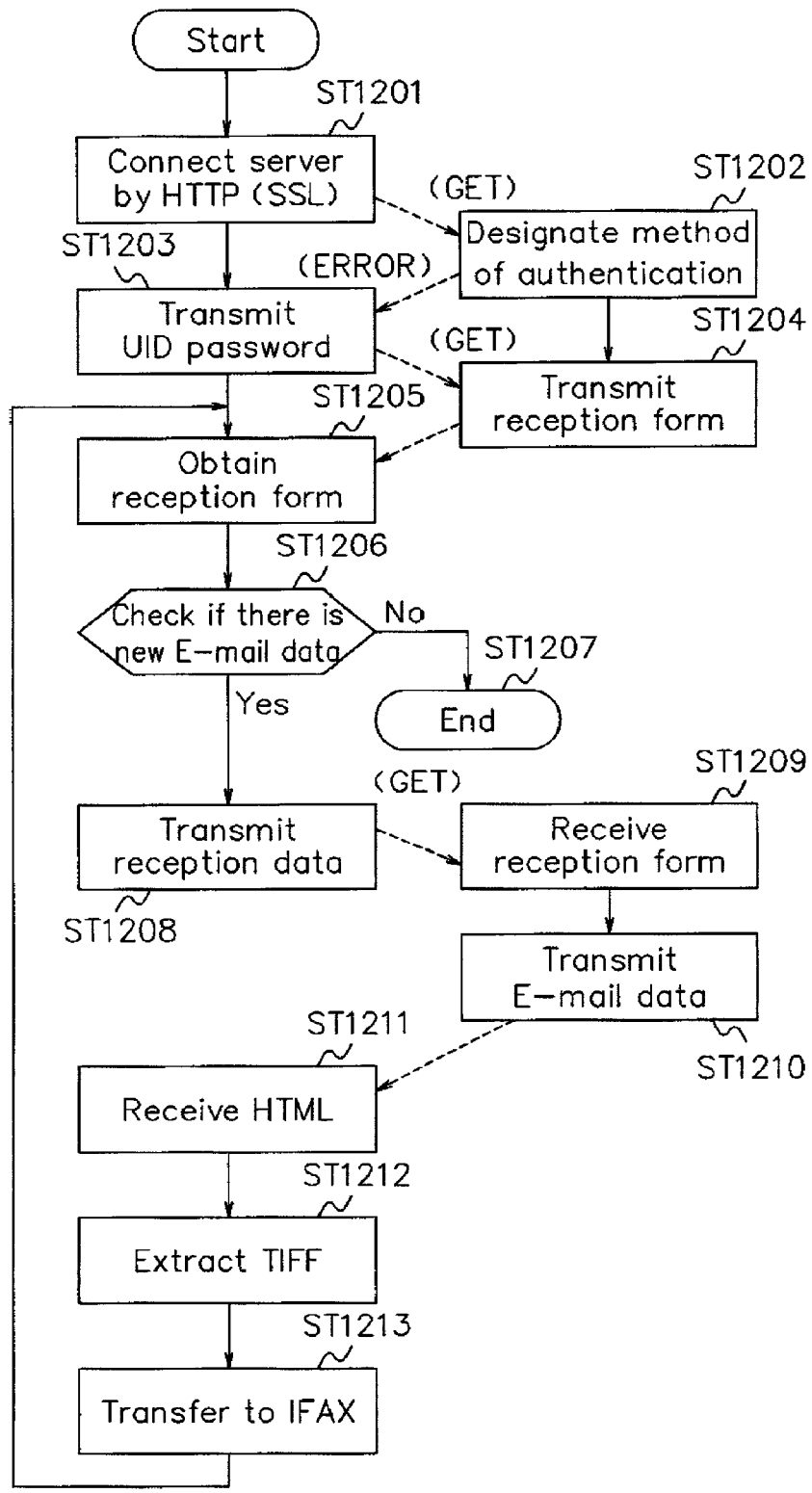
FIG. 12 is a flow chart for the case that ADPT of the first embodiment receives email data from a groupware server.

Next, a process in which IFAX 101, to which ADPT 100 is connected, receives emails from the groupware server 104 is described using a flow chart shown in FIG. 12, referring to a sequence chart shown in FIG. 11. FIG. 11 is a sequence chart for the case that IFAX 101, to which ADPT 100 of the present embodiment is connected, receives emails from the groupware server 104. FIG. 12 is a flow chart for the case that ADPT 100 of the present embodiment receives email data from the groupware server 104.

IFAX 101 first executes a procedure to establish the connection with ADPT 100 when it receives an email from the groupware server 104 in the same way as when it transmits an email to the groupware server 104. When the connection between IFAX 101 and ADPT 100 is established, ADPT 100 executes a procedure to establish the connection with the groupware server 104 in the same way when ADPT 100 transmits an email to the groupware server 104.

When the connection between ADPT 100 and the groupware server 104 is established, the SMTP_EPOP3 processing section 401 of ADPT 100 starts communication of command signals with IFAX in accordance with POP3 protocol after transmitting a final confirmation command signal(ACK) to the groupware server 104. More specifically, the SMTP_EPOP3 process section 401 outputs OK-response showing positive response to IFAX 101.

Receiving the OK-response, IFAX 101 outputs a command signal(USER) that indicates transmission of a mailbox name to ADPT 100. Receiving "USER" signal, the signal type detection section 400 of ADPT 100 notifies SMTP_EPOP3 processing section 401 of the reception. Receiving the notification, the SMTP_EPOP3 processing section 401 outputs OK-response that shows positive response to IFAX 101.

After this, the SMTP_EPOP3 processing section 401 receives a command signal (PASS) that shows transmission of mailbox_Epassword, a command signal (STAT) that shows inquiry of reception status, and a command signal (RETR) that shows a request for mail download, each outputted from IFAX 101. And the SMTP_EPOP3 process section 401 outputs an OK-response to each of these commands as positive response to IFAX 101.

After "STAT" is received, OK-response outputted to IFAX 101 includes number of email data to be received and data size of each email data. ADPT100 transmits a command signal (GET) that includes information of linked terminals to the groupware server 104 between the "RETR" signal received from IFAX 101 and the OK-response corresponding to the "RETR" signal outputted to IFAX101. At the same time, ADPT 100 receives email data transmitted from the groupware server 104.

Then ADPT 100 outputs email data to IFAX 101 after outputting the OK-response as a positive response to "RETR" to IFAX 101.

On the other hand, receiving "USER" signal from IFAX 101, the signal type detection section 400 of ADPT 100 notifies the HTTP processing section 402 of the reception. Receiving the notification, the HTTP processing section 402 starts communicating command signals with the groupware server 104 in accordance with HTTP protocol. More specifically, the HTTP process section 402 outputs a command signal (GET) requesting connection to the groupware server 104. As the result, HTTP protocol establishes the connection with the groupware server 104 in accordance with HTTP protocol (ST1201).

Receiving the "GET" signal, the groupware server 104 outputs an error signal including authentication request as a response signal to ADPT 100. The error signal consists of a header and HTML document data. And a method of authentication is designated in the HTML document data. Thus the method of authentication is designated by groupware server 104 (ST1202).

Receiving the error signal, the HTTP process section 402 transmits a command signal (GET) showing request of reception form with an attached predefined user ID (UID) and password (ST1203).

Receiving the "GET" signal, the groupware server 104 checks if the UID and password attached to "GET" is correct or not. When it is correct, the groupware server 104 outputs data including reception form (hereafter referred to as "reception form data") as a response to ADPT 100 (ST1204).

FIG. 13 illustrates source data of reception form data transmitted from the groupware server 104. As shown in FIG. 13, the reception form data consists of header and HTML document data. And the HTML document data includes the reception form or type. By receiving the reception form, ADPT 100 can recognize the reception form for example shown in FIG. 14. FIG. 14 is a conceptual drawing of the reception form transmitted from the groupware server 104.

Receiving reception form data, the HTML communication section 404 of ADPT 100 extracts the reception form described by HTML document data from the reception form data (ST 1205). At this time, the HTTP process section 402 notifies the reception of the reception form data to the signal type detection section 400.

Receiving the notification of the reception of the reception form data, the signal type detection section 400 notifies the SMTP_EPOP3 process section 401 of the reception. Receiving this notification, the SMTP_EPOP3 process section 401 transmits number of email data and size of each email data that were extracted from the reception form written in the HTML document data by the HTML process section 405, attaching OK-response to "STAT" to IFAX 101.

Receiving the reception form, ADPT 100 checks if there is new email data in the reception form (ST1206). Here, when there is no new email data, reception process of email by IFAX 101 is ended(ST1207).

On the other hand, when there is new email data, IFAX 101 transmits a command signal (GET) that includes reception form instructing the reception data. In other words, the reception form includes instruction of link to the groupware server 104 (ST1208). When there is new email data.

FIG. 15 shows the source data of "GET" that includes reception form transmitted from ADPT 100. By receiving "GET" including reception form, the groupware serve 104 can recognize the reception request of email data shown in the upper row of FIG. 14.

Receiving "GET" (ST1209), the groupware server 104 transmits email data corresponding to the "GET" to ADPT 100 (ST1210).

In this process, the email data transmitted from the groupware server 104 is written as HTML document data. The HTML communication section 404 receives the email data (ST1211). Then, the HTML processing section 405 extracts TIFF file from the email data written in HTML document (ST1212), and stores the TIFF file in RAM 202.

When TIFF file is stored in RAM 202, the email communication section 403 retrieves the TIFF file and transfers to IFAX 101 (ST1213).

After transferring the email data, the email communication section 403 receives a command (DELE) that shows request for deleting email outputted from IFAX 101. Receiving the "DELE", the email communication section 403 transmits a command signal (POST), which includes reception form requesting deletion of email data that have been downloaded among emails written in the reception form, to the groupware server 104. Here it is assumed that the email data in the upper row shown in FIG. 14 have been downloaded. So it requests deletion of email data.

FIG. 16 shows the source data of "POST" including reception form transmitted from ADPT 100. As shown in FIG. 16, the "POST" consists of header and data to be transmitted. Header has information for identifying the email data that requests deletion. And the data to be transmitted includes data for checking the delete check box shown in conceptual table shown in FIG. 14.

Receiving "POST", the groupware server 104 starts CGI process for deleting the designated email data and executes the deletion process of the email data. After the deletion process of email data, the groupware server 104 transmits the reception form that includes remainder of email data after deletion process to ADPT 100 again. Here the reception form that has only the email data shown in the lower row of FIG. 14 is transmitted to ADPT 100.

Receiving the reception form, ADPT 100 outputs OK-response as a positive response to "DELE" mentioned above. Then, receiving the OK-response, IFAX 101 requests download of the next email data by outputting "RETR" to ADPT 100 in the same way as discussed above. Here, download of the email data in the lower row of FIG. 14 is requested. Since the process is the same as described above, description is omitted.

After finishing the download of all email data included in reception form, IFAX 101 outputs "DELE" to ADPT 100 and receives OK-response as positive response from ADPT 100. Then IFAX 101 transmits a command (QUIT) showing completion notification.

Receiving "QUIT", ADPT 100 outputs OK-response as a positive response. Thus, the connection between IFAX 101 and ADPT 100 is disconnected.

Thus various signals and email data are communicated between IFAX 101 and ADPT 100 in accordance with POP3 protocol in the same way as regular email data. On the other hand, various signals and email data are communicated in accordance with HTTP protocol between ADPT 100 and the groupware server 104 according to the reception of "USER" transmitted from IFAX 101.

When IFAX 101 receives emails from the groupware server 104, ADPT 100 of the present embodiment communicates various signals and email data with IFAX 101 in accordance with POP3 protocol. And at the same time, ADPT 100 communicates various signals and email data with the groupware server 104 in accordance with HTTP protocol. Thus IFAX 101 can receive emails normally even on the groupware network 103 communicated in accordance with HTTP protocol.

Second Embodiment

Figure 17:
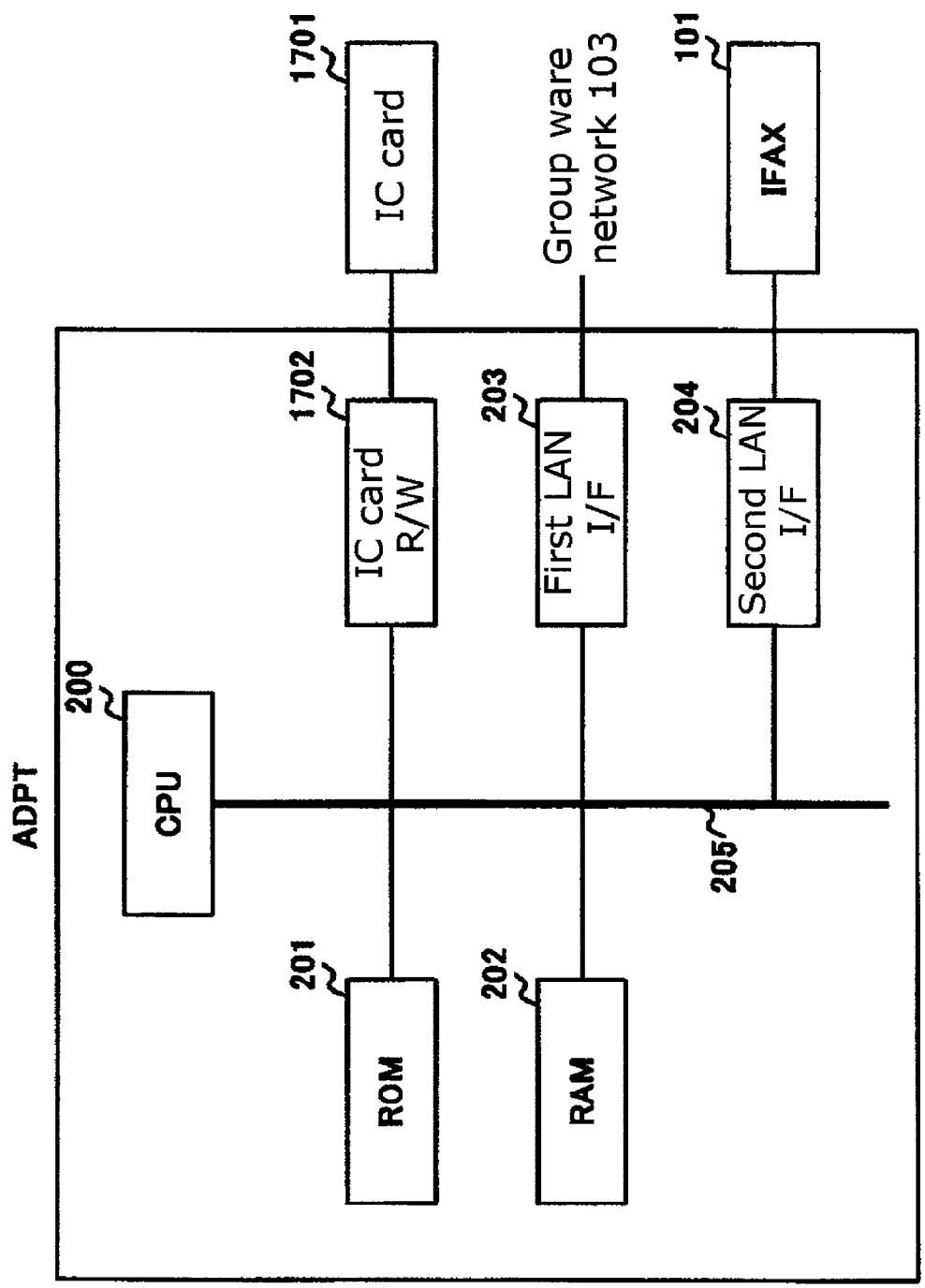
FIG. 17 is a block diagram showing the hardware configuration of ADPT of the second embodiment of the present invention.

FIG. 17 is a schematic block diagram of the hardware of ADPT 100 of the second embodiment of the present invention. In FIG. 17, components designated by the same reference numerals as in FIG. 3 are omitted from the description since they have the same function.

As shown in FIG. 17, ADPT 100 of the second embodiment comprises an IC card read/write section (hereafter referred to as "IC card R/W section") that writes data into a predetermined IC card 1701 or reads the data written in IC card 1701, in addition to the component provided in the configuration of the first embodiment.

IC card 1701 is distributed in advance to a user who receives/transmits emails from IFAX 101. The data written in IC card 1701 will be described in detail later.

Figure 18:
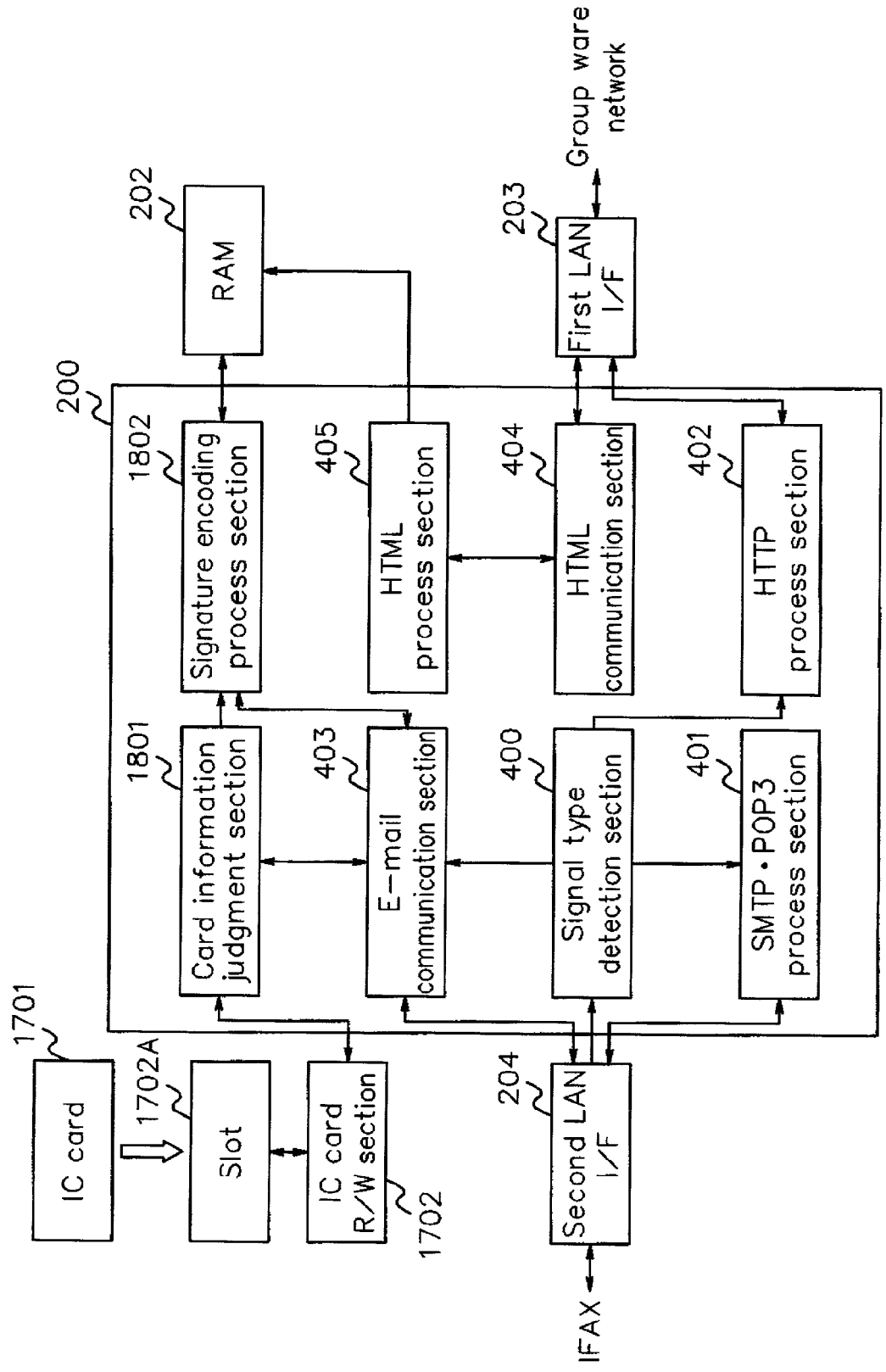
FIG. 18 is a block diagram showing primary functions of ADPT of the second embodiment of the present invention.

FIG. 18 is a schematic block diagram showing primary functions of ADPT 100 of the second embodiment. Here components that are identified by the same reference numericals as in FIG. 4 are not described since they have the same function.

The card information judgment section 1801 judges the contents of information that the IC card R/W section 1701 reads from the IC card 1701 inserted to the IC card slot section 1702A. When information necessary for a signature process or a signature encryption process is stored in IC card 1701, the IC card information judgment section 1801 sends the information to the signature encryption or encoding processing section 1802.

The IC card judgment section 1801 also judges if IC card 1701 is inserted or not based on the information that the IC card R/W section 1702 reads out. Further, the IC card information judgment section 1801 detects email address stored in IC card 1701 and transmits the email address information to the email communication section 403.

The signature encryption process section 1802 executes encrypting process on the email data that the email communication section 403 receives from IFAX 101 based on the information necessary for a signature encrypting or encoding processing received from the card information judgment section 1801. The signature encryption process section 1802 also executes a decrypting process on the email data that the email communication section 403 receives from the groupware network 103. The decrypting process is executed based on the information necessary for a signature encrypting process received from the card information judgment section 1801.

The information stored in IC card 1701 will now be described._@As mentioned above, IC card 1701 is delivered to each user who uses IFAX 101 for email communication and stores email address information assigned to each user. Consequently, only when IC card 1701 is inserted in ADPT 100, can each user send emails from one's email address and receive emails addressed to one's email address.

IC card 1701 stores information necessary for signature process or signature encrypting process. In other words, IC card 1701 stores one's secret key information and public key information. Public key information for an addressee is stored in RAM 202 of ADPT 100.

Figure 19:
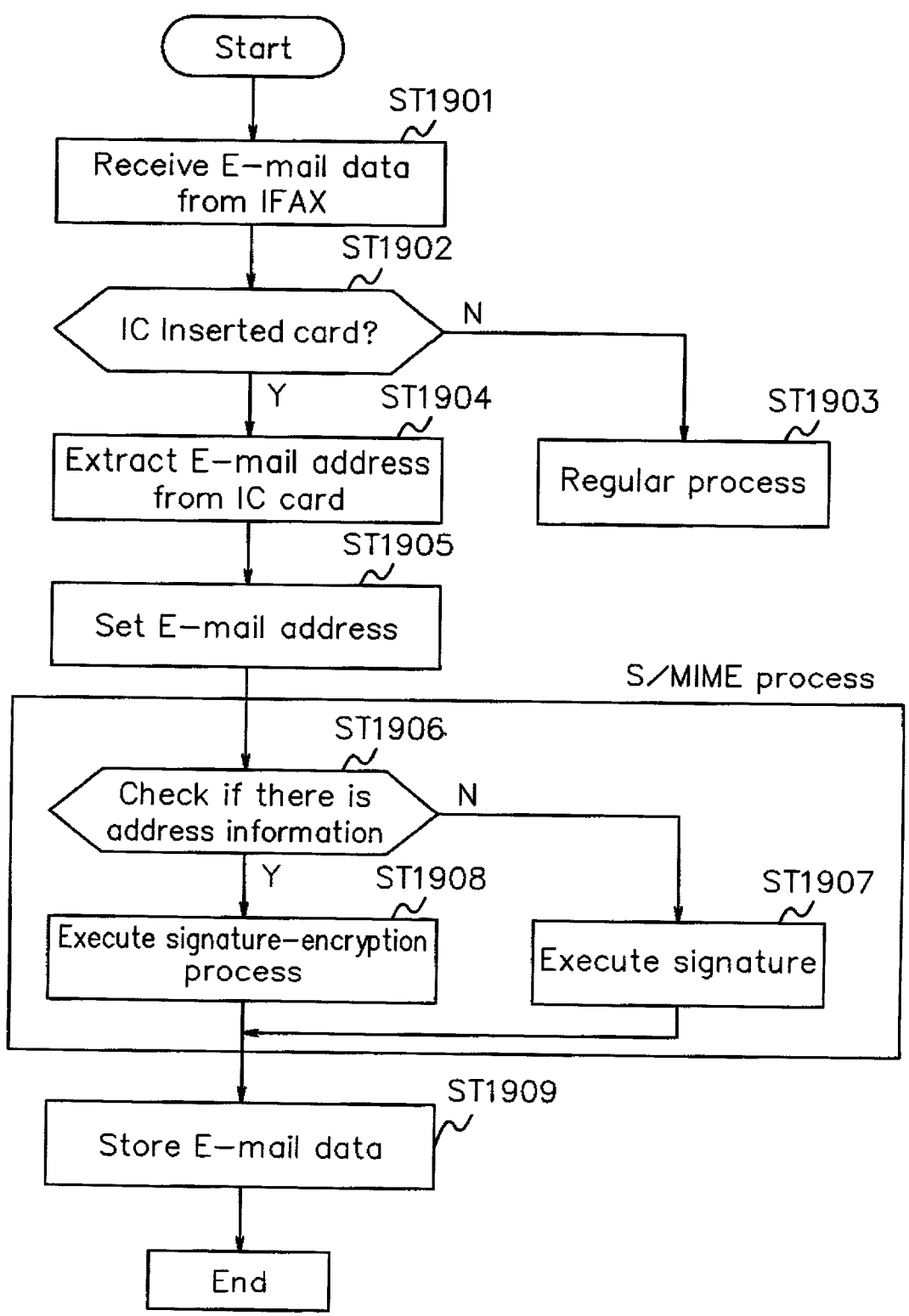
FIG. 19 is a flow chart of a process such as signature encryption process for email data that ADPT of the second embodiment received from a groupware server.

Next, the process for the case that IFAX 101, to which ADPT 100 is connected, transmits emails to the groupware server 104 is described using the flow chart shown in FIG. 19 referring to the sequence chart shown in FIG. 5. FIG. 19 is a flow chart that shows the processes that ADPT 100 of the second embodiment executes, and processes such as a signature encrypting process for email data received from IFAX 101. Here, it is assumed that all email data transmitted from IFAX 101 are encrypted.

When IFAX 101 transmits email to the groupware server 104 in the second embodiment, communication of various signals between IFAX 101 and ADPT 100 in accordance with SMTP protocol takes place. After that, the groupware server 104 receives email data in the same way as in the first embodiment described using FIG. 5. Received email data is encrypted as described later, and at the same time, the original email data is stored in RAM 202 until the end of the process in which given data is written in transmission form.

Receiving email data from IFAX 101 (ST1901), the card information judgment section 1801 judges if IC card 1701 is inserted in the slot 1702A based on the information read by the IC card R/W section 1702 (ST1902).

When IC card 1701 is not inserted in the slot 1702A of ADPT 100, ADPT 100 executes transmission process of a regular email(ST1903). In other words, an email is transmitted from the email address given by IFAX 101.

On the other hand, when IC card 1701 is inserted to the slot 1702A of ADPT 100, the IC card R/W section 1702 extracts information about a user (hereafter referred to as user information) from IC card 1701. In this process, email address information of the user is extracted (ST1904).

The card information judgment section 1801 detects email address information from the user information that the IC card R/W section 1702 extracted and transmits it to the email communication section 403. The email communication section 403 sets the email address information to sender information (ST1905). More specifically, the extracted email address information is set to [From:] of header information.

When email sender information is set, ADPT 100 executes S/MIME process. First, ADPT 100 checks if there is addressee information (ST1906). More specifically, ADPT 100 checks if public key information of addressee is stored in RAM 202.

When there is no addressee information, the card information judgment section 1801 detects the users secret key information from the user information extracted by the IC card R/W section 1702. Then the card information judgment section 1801 sends it to the signature encryption process section 1802. The signature encryption process section 1802 executes a signature process using the user's secret key information (ST1907).

More specifically, a message digest is obtained by the calculation with an irreversible function such as hash function from message data of email data. And the message digest is encrypted using the user's secret key information.

On the other hand, when there is addressee information, the signature encryption process section 1802 obtains public key information. The card information judgment section 1801 obtains the user's secret key information from the user information extracted by the IC card R/W section 1702 and sends it to the signature encryption processing section 1802. The signature encryption processing section 1802 executes a signature-encryption process using the user's secret key information and public key information of the addressee. (ST1908)

More specifically, message digest is obtained by calculating with an irreversible function such as hash function from the message of an email. Then the message digest is encrypted using the user's secret key information as mentioned above. And an encryption key that uses quasi-random number called DEK (Data Encryption Key) is created. Then DEK is encrypted using the public key information of the addressee. The message digest that was encrypted previously (signature process result) and the message data of an email are encrypted using an encrypting method predetermined in DEK (for example, DES: Data Encryption Standard).

After the signature encrypting process in ST1907 or 1908, the signature encryption process section 1802 stores the email data in RAM 202 (ST1909).

When the email data after signature encryption process is stored in RAM 202, the HTML process section 405 extracts addressee information("To" in FIG. 8), subject information ("subject" in FIG. 8) and file name information("file name" in FIG. 8), and writes them into the predetermined areas of transmission form. Then the transmission form is sent to the HTML communication section 404. The HTML communication section 404 transmits a command signal (POST) including the transmission form to the groupware server 104. At the same time, the email data executed signature encryption process is retrieved from RAM 202, and it is transmitted to the groupware server 104. Thus ADPT 100 completes signature-encryption process of the email data received from IFAX 101.

As mentioned above, by the use of ADPT 100 of the present embodiment, IFAX 101 can normally perform a transmission process of emails on the network in accordance with HTTP protocol when IFAX 101 transmits emails. Furthermore, it is possible to achieve confidentiality of emails without adding special components to conventional IFAX because ADPT 100 can executes encryption process on email data when necessary.

In the encryption process of emails, ADPT 100 checks if IC card 1701 distributed to each user is inserted or not, and judges the necessity of an encryption process. Thus it is possible for email data not requiring encryption to be transmitted without encryption and for email data requiring encryption to be transmitted after encryption. And it is easy to judge the necessity of performing the encryption process.

Further, in the encryption process of emails, ADPT 100 the executes encryption process using the information necessary for encryption stored in the inserted IC card 1701. Since the information used for encryption process is stored in IC card 1701 managed by each user, it is possible to avoid the information being tampered.

Figure 20:
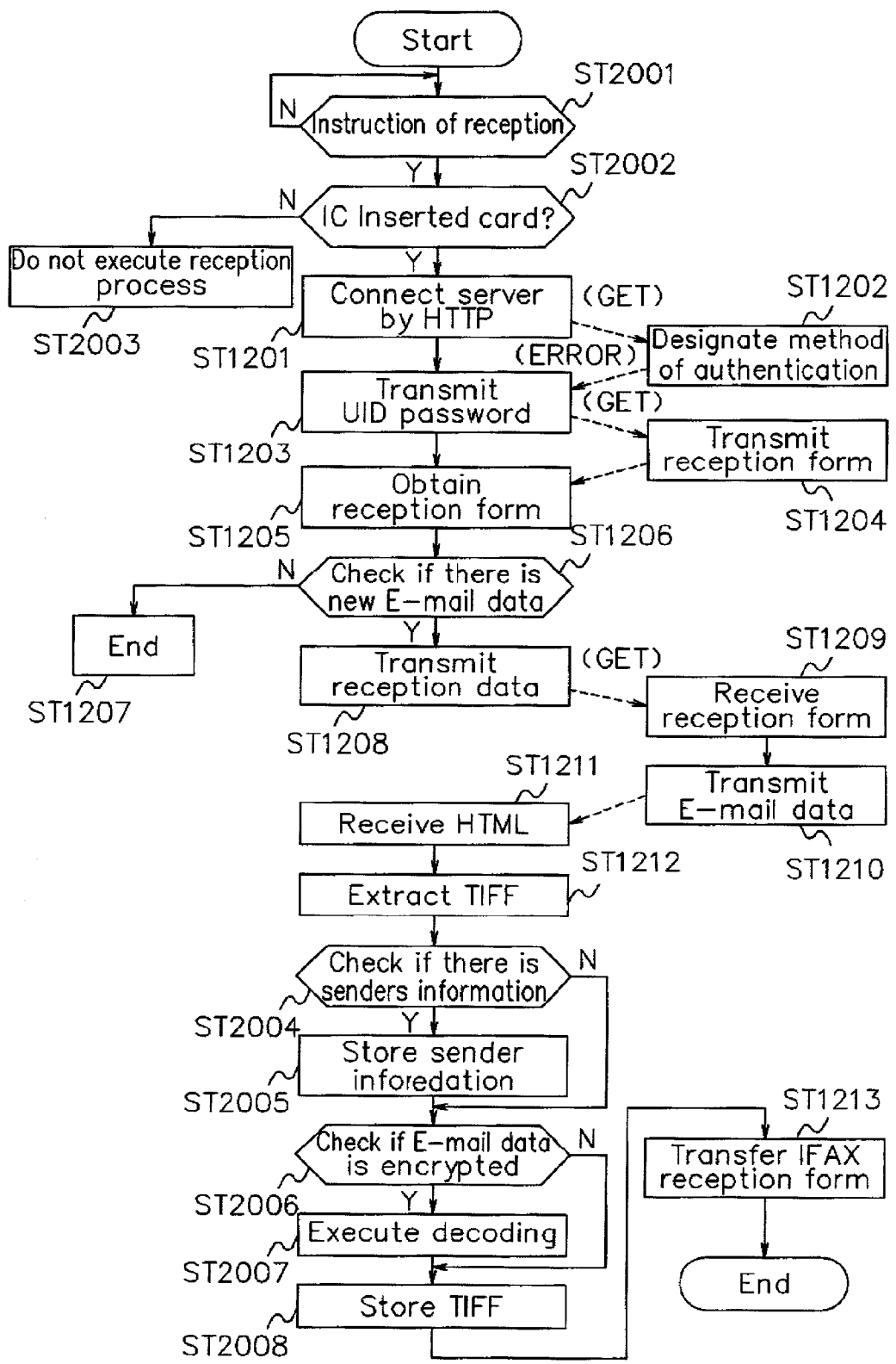
FIG. 20 is a flow chart for the case that ADPT receives email data from a groupware server and executes decoding process for the email data that is executed by a process such as signature encryption process.

Next, the process for the case that IFAX 101, to which ADPT 100 is connected, receives emails from the groupware server 104 is described using the flow chart shown in FIG. 20 referring to the sequence chart shown in FIG. 11. FIG. 20 is a flow chart of the process by which ADPT 100 receives email data from the groupware server 104 and decodes the email data that is subjected to a signature encryption process. In FIG. 20, the same reference numerals as shown in FIG. 12 are utilizes to represent the performance of same process. Also it is assumed that all emails received from the groupware server 104 are executed by an encryption process.

In the second embodiment, receiving emails from the groupware server 104, first, IFAX 101 executes a procedure to establish the connection with ADPT 100 in the same way as described in the first embodiment using FIG. 11. In this process, ADPT 100 recognizes a "SYN" signal, which is transmitted for establishing the connection with ADPT 100, as an instruction for reception of emails. Thus ADPT 100 can recognize instructions for reception (ST2001).

Recognizing instruction of email reception, the card information judgment section 1801 judges if IC card 1701 is inserted in the slot 1702A of ADPT 100 based on the information read out by the IC card R/W section 1702 (ST2002).

When IC card 1701 is not inserted into the slot 1702A, ADPT 100 does not execute reception process of email because it is not possible to confirm the email address of the user that IFAX 101 instructed (ST2003).

On the other hand, when IC card 1701 is inserted into the slot 1702A of ADPT100, given commands and responses are communicated. The connection between IFAX 101 and ADPT 100, and the connection between ADPT 100 and the groupware server 104 are established. After establishing these connections, ADPT 100 connects to the groupware server in accordance with HTTP protocol in the same way as described in FIG. 11 (ST 1201).

After establishing the connection between the groupware server 104 and ADPT 100 in accordance with HTTP protocol, when an error signal including authentication request from the groupware server 104 is received, the HTTP process section 402 of ADPT 100 transmits it attaching a command signal (GET) showing request for preset UID and password reception form (ST1203).

Receiving "GET", the HTML communication section 404 of ADPT 100 receives reception form data that is outputted from the groupware server 104 in ST1204. Then the HTML communication section 404 extracts reception form written in HTML document data from the reception form data and obtains reception form (ST1205).

Receiving reception form, ADPT 100 checks if there is new email data in the reception form (ST1206). Then ADPT 100 transmits a command signal (GET) including reception form that has link instructions when there is new email data to the groupware server 104 (ST1208).

When the groupware server 104 receives the "GET" (ST1209), the HTML communication section 404 receives email data written in HTML document data, which is outputted from the groupware server 104 corresponding to the "GET" in the process ST1210 (ST1211). Then the HTML process section 405 extracts TIFF file from the email data written in the HTML document data (ST1212) and stores the TIFF file in RAM 202. It is assumed that the TIFF file is encrypted.

When the TIFF file is stored in RAM 202, ADPT 100 checks if there is sender's information (ST2004). More specifically, ADPT 100 checks if public key information of the sender is stored. The public key information is used to decrypt the message digest of the email.

When there is public key information, the public key information of the sender given to the email is stored in RAM 202 of ADPT 100 (ST2005). And the signature encryption process section 1802 checks if the email data is encrypted or not. On the hand, if there is no public key information of the sender, then the signature encryption process section 1802 checks if the email data is encrypted or not without saving the public key information (ST2006).

Since it is assumed that the email data is encrypted, the signature encryption process section 1802 retrieves the TIFF file from RAM 202 and executes decoding process of the TIFF file (ST2007).

More specifically, the signature encryption process section 1802 decodes encrypted DEK by using its secret key information and encrypts encrypted data by the decoded DEK. Then the decoded data is divided into a message digest and message data. In this process, the message digest is decoded by the public key information of the sender and stored. Then massage digest is extracted from the divided message digest using a hash function as mentioned above. The message digest obtained above and the message digest stored previously are compared. This makes it possible to confirm if the message data of the email has been tampered with or if the message is sent from an authorized sender.

When the message data is not encrypted, the signature encryption process section 1802 decodes only the message digest and confirms if the message digest is from an authorized sender.

Then the signature encryption process section 1802 stores the TIFF file decoded as mentioned above to RAM 202 (ST2008). When the decoded TIFF file is stored in RAM 202, the email communication section 403 retrieves the TIFF file and transfers it to IFAX 101 in the same way as described in FIG. 11 (ST1213). Thus ADPT 100 completes the decoding process of email data received from the groupware server 104.

As described above, ADPT 100 of the present embodiment enables IFAX 101 to receive emails normally on the network that uses HTTP protocol for communication when it receives emails from the groupware server 104. Besides, ADPT 100 of the present embodiment can check if the email is encrypted, and if encrypted, transfers the email data after decoding. This makes it possible to receive emails while maintaining confidentiality without adding any special component to existing IFAX.

In the reception process of emails, ADPT 100 checks if an IC card 1701 that is provided to each user is inserted and does not execute reception process of emails when there is no IC card 1701.

In this embodiment, IC card 1701 inserted to ADPT 100 is set up as a memory card to store information necessary for signature encryption. However IC card set up is not limited to this, and for example, it is also possible for the IC card to store programs for signature encryption process and a part or all the process can be executed in the IC card. In such a case, for example, receiving encrypted message digest (hash value) or encrypted DEK from ADPT 100, the IC card can execute the necessary encryption process or a part of decoding process. Since necessary data is received and used for the encryption process, it is possible to prevent the information necessary for encryption to be seen by another person more confidently, as compared with the case that the IC card stores only the information necessary for the encryption process.

In the present embodiment, information necessary for the encryption process is stored in IC card 1701 and an encryption process apparatus 100 that executes encryption process was described. However, it is also possible to store the information necessary for encryption process in the encryption process apparatus 100. The same result is obtained in such a case as the present embodiment.

As described above, a communication control apparatus of the present invention is set up so that it communicates various signals and email data with an IFAX using SMPT protocol or POP 3 protocol. On the other hand, the communication control apparatus communicates with a groupware server using HTTP protocol for the communication between IFAX and a groupware server. This makes it possible for IFAX to operate normally on the network managed using HTTP protocol.

The present invention is not limited to the above described embodiments, and various variations and modifications may be possible without departing from the scope of the present invention.

This application is based on the Japanese Patent Application No. 2000-236917 filed on Aug. 4, 2000, entire content of which is expressly incorporated by reference herein.

What is claimed is:

1. A communication control apparatus, comprising:
   a first interface connected to a network that is controlled by a server in accordance with a HTTP protocol;
   a second interface connected to an Internet facsimile apparatus that transmits e-mail data in accordance with a SMTP protocol;
   a SMTP processor that controls communication with the Internet facsimile apparatus in accordance with the SMTP protocol;
   a HTTP processor that controls communication with the server in accordance with the HTTP protocol;
   an e-mail communicator that receives the e-mail data from the Internet facsimile apparatus under the control of the SMTP processor;
   a processor that produces command data for the server based upon the e-mail data received from the Internet facsimile apparatus; and
   a communicator that transmits the command data produced by the processor and the e-mail data received from the Internet facsimile apparatus to the server under the control of the HTTP processor.

2. The communication control apparatus according to claim 1, the server being configured to manage a network by a groupware software and the communication control apparatus being connected with the server via the network.

3. The communication control apparatus according to claim 2, wherein the command data comprises information regarding a destination of the e-mail and is in HTML format.

4. The communication control apparatus according to claim 3, wherein the e-mail data is stored in a mailbox of the server, when the destination for the e-mail data is a terminal managed by the server, and, when the destination is a terminal not managed by the server, the e-mail data is transferred to a mail server connected with the server via the Internet.

5. The communication control apparatus according to claim 4, further comprising:
   a signal-type detector that detects a type of a signal transmitted via the first interface, wherein, when said signal-type detector detects reception of a predetermined signal type from the Internet facsimile apparatus, said HTTP processor starts controlling communications with the server in accordance with the HTTP protocol and said SMTP processor controls communication with the Internet facsimile apparatus in accordance with the SMTP protocol.

6. The communication control apparatus according to claim 5, wherein said HTTP processor starts controlling a communication with the server in accordance with the HTTP protocol when a HELO signal, which is a command signal in accordance with the SMTP protocol, is received from the Internet facsimile apparatus.

7. The communication control apparatus according to claim 6, further comprising:
an encryption processor that encrypts the e-mail data received by said e-mail communicator;
wherein said communicator transmits the command data produced by said processor and the e-mail data encrypted by said encryption processor to the server under the control of said HTTP processor.

8. The communication control apparatus according to claim 7, further comprising:
an IC card that stores information to perform an encryption process by said encryption processor, and a slot into which said IC card is insertable;
wherein said encryption processor encrypts the e-mail data in accordance with the information stored in said IC card, when said IC card is inserted into said slot.

9. The communication control apparatus according to claim 1, said processor being configured to produce the command data by extracting addressee, subject, and file name data from the e-mail data received from the Internet facsimile apparatus.

10. A communication control apparatus comprising:
a first interface connected to a network that is controlled by a server in accordance with a HTTP protocol;
a second interface connected to an Internet facsimile apparatus that receives e-mail data in accordance with a POP3 protocol;
a POP3 processor that controls communication with the Internet facsimile apparatus in accordance with the POP3 protocol;
a HTTP processor that controls communication with the server in accordance with the HTTP protocol;
a HTML communicator that receives HTML data including image data from the server under the control of said HTTP processor;
a HTML processor that extracts the image data from the HTML data received from the server;
an e-mail communicator that transmits the image data to the Internet facsimile apparatus under the control of said POP 3 processor;
a processor that produces command data for the server based upon the e-mail data received from the Internet facsimile apparatus; and
a communicator that transmits the command data produced by the processor and the e-mail data received from the Internet facsimile apparatus to the server under the control of the HTTP processor.

11. The communication control apparatus according to claim 10, wherein the image data is a TIFF file.

12. The communication control apparatus according to claim 10, further comprising:
a signal-type detector that detects a type of signal transmitted by said first interface;
wherein said HTTP processor starts communication with the server in accordance with the HTTP protocol and said POP3 processor controls communication with the Internet facsimile apparatus in accordance with the POP3 protocol when said signal-type detector detects transmission of a predetermined type of signal from the Internet facsimile apparatus.

13. The communication control apparatus according to claim 12, wherein said HTTP processor starts controlling communication with the server in accordance with the HTTP protocol when said signal-type detector receives a USER signal, which comprises a command signal in accordance with the POP3 protocol, from the Internet facsimile apparatus.

14. The communication control apparatus according to claim 10, further comprising:
a decryption processor that decrypts the image data when the image data extracted from the HTML data by said HTML processor is encrypted e-mail data;
wherein said e-mail communicator transmits the image data decrypted by said decryption processor to the Internet facsimile apparatus.

15. The communication control apparatus according to claim 14, further comprising:
an IC card that stores information necessary for decryption by said decryption processor; and
a slot into which said IC card is insertable;
wherein said decryption processor decrypts the encrypted image data in accordance with the information stored in said IC card when said IC card is inserted into said slot.

16. The communication control apparatus according to claim 14, wherein said IC card stores e-mail address information and said HTML communicator transmits the HTML data corresponding to the e-mail address information stored in said IC card when said IC card is inserted into said slot.

17. A communication control method comprising:
controlling communication with a server in accordance with a HTTP protocol via a first interface connected to a network managed by a server in accordance with a HTTP protocol;
controlling a communication with an Internet facsimile apparatus in accordance with a SMTP protocol when a predetermined signal-type is detected;
detecting the predetermined signal-type in accordance with the SMTP protocol from a second interface connected to an Internet facsimile apparatus;
receiving e-mail data from the Internet facsimile apparatus in accordance with the SMTP protocol;
producing command data for the server based on the e-mail data received from the Internet facsimile apparatus; and
transmitting HTML data to the server in accordance with the HTTP protocol.

18. The communication control method according to claim 17, wherein producing command data comprises extracting addressee, subject, and file name data from the e-mail data received from the Internet.

19. A communication control method comprising:
controlling communication with a server in accordance with a HTTP protocol via a first interface connected to a network managed by the server in accordance with the HTTP protocol;
controlling communication with an Internet facsimile apparatus in accordance with a POP3 protocol when a predetermined signal-type is detected;
detecting the predetermined signal-type in accordance with the POP3 protocol from a second interface connected to an Internet facsimile apparatus;
receiving HTML data including image data from the server in accordance with the HTTP protocol;
extracting the image data from the HTML data;
transmitting the extracted image data to the Internet facsimile apparatus in accordance with the POP 3 protocol;
producing command data for the server based on the e-mail data received from the Internet; and transmitting HTML data to the server in accordance with the HTTP protocol.

* * * * *